US009172518B2

United States Patent
Frenne et al.

(10) Patent No.: US 9,172,518 B2
(45) Date of Patent: Oct. 27, 2015

(54) APPARATUS, SYSTEM, AND METHOD FOR SIGNALING A QUANTITY OF ANTENNA PORTS IN A WIRELESS COMMUNICATION SYSTEM

(71) Applicant: Huawei Technologies Co., Ltd., Shenzhen (CN)

(72) Inventors: Mattias Frenne, Uppsala (SE); Branislav Popovic, Kista (SE); Jianghua Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/511,754

(22) Filed: Oct. 10, 2014

(65) Prior Publication Data
US 2015/0023311 A1      Jan. 22, 2015

Related U.S. Application Data

(63) Continuation of application No. 13/165,544, filed on Jun. 21, 2011, now Pat. No. 8,885,529, which is a continuation of application No. PCT/CN2009/072516, filed on Jun. 29, 2009.

(30) Foreign Application Priority Data

Dec. 22, 2008   (CN) .............................. 2008 0 73631

(51) Int. Cl.
*H04B 7/00*       (2006.01)
*H04L 5/00*       (2006.01)
(Continued)

(52) U.S. Cl.
CPC ................. *H04L 5/0053* (2013.01); *H04B 7/06* (2013.01); *H04L 1/0041* (2013.01); *H04L 5/0023* (2013.01); *H04W 88/02* (2013.01)

(58) Field of Classification Search
CPC ...................................... H04L 5/0023
USPC ......................................... 370/310
See application file for complete search history.

(56) References Cited

U.S. PATENT DOCUMENTS 6,493,331 B1     12/2002 Walton et al.
8,885,529 B2 *   11/2014 Wennstrom et al. .......... 370/310
(Continued)

FOREIGN PATENT DOCUMENTS

CN     1745590 A     3/2006
EP     2274851 A2    1/2011
(Continued)

OTHER PUBLICATIONS

Nokia Siemens Networks et al., "CRC Mask Selection for PBCH" Agenda Item 6.2, 3GPP TSG RAN WG1 #52 Meeting. Sorrento, Italy, Feb. 11-15, 2008. R1-080944.
(Continued)

*Primary Examiner* — Wei Zhao
(74) *Attorney, Agent, or Firm* — Brinks Gilson & Lione (57) ABSTRACT

A quantity of antenna ports of a transmitting apparatus is signalled in a wireless communication system. The quantity of antenna ports of the transmitting apparatus is encoded into a first type information and a second type information. The first type information is transmitted on a physical broadcast channel (PBCH); and the second type information is transmitted on a physical downlink shared channel (PDSCH). The PDSCH is transmitted on at least one antenna port indicated by the first type information.

32 Claims, 3 Drawing Sheets

(51) Int. Cl.
    *H04L 1/00*    (2006.01)
    *H04B 7/06*    (2006.01)
    *H04W 88/02*   (2009.01)

(56) References Cited

U.S. PATENT DOCUMENTS

| | | | | |
|---|---|---|---|---|
| 2002/0131381 | A1* | 9/2002 | Kim et al. | 370/335 |
| 2006/0034217 | A1 | 2/2006 | Kwon et al. | |
| 2007/0117592 | A1 | 5/2007 | Bauman | |
| 2008/0019350 | A1 | 1/2008 | Onggosanusi et al. | |
| 2008/0136716 | A1 | 6/2008 | Annsmaa et al. | |
| 2008/0273452 | A1* | 11/2008 | Khan et al. | 370/203 |
| 2009/0060088 | A1* | 3/2009 | Callard et al. | 375/299 |
| 2010/0091743 | A1 | 4/2010 | Kazmi et al. | |

FOREIGN PATENT DOCUMENTS

| | | |
|---|---|---|
| JP | 2008507231 A | 3/2008 |
| RU | 2264036 C2 | 11/2005 |
| WO | WO 2006/016746 A1 | 2/2006 |
| WO | WO 2007/023524 A1 | 3/2007 |
| WO | WO 2007/076895 A1 | 7/2007 |
| WO | WO 2008/048060 A1 | 4/2008 |
| WO | WO 2008/136750 A2 | 11/2008 |
| WO | WO 2009/088217 A2 | 7/2009 |
| WO | WO 2009/134959 A2 | 11/2009 |
| WO | WO 2010/072020 A1 | 7/2010 |
| WO | WO 2010/072068 A1 | 7/2010 |

OTHER PUBLICATIONS

Nortel, "Discussion on the Improvement of the Blind Detection of the Antenna" Agenda Item 6.4.5, 3GPP TSG-RAN 1 Meeting #50-bis, Shanghai, China, Oct. 8-12, 2007, 9 pages.

Nortel, "The Reliability Improvement of the Blind Detection of the Antenna" Agenda Item 6.1.8, 3GPP TSG-RAN 1 Meeting #51-bis, Sevilla, Spain, Jan. 14-18, 2008, 6 pages.

Motorola, "Common Reference Symbol Mapping/Signaling for 8 Transmit Antennas" Agenda Item 12, 3GPP TSG RAN1 #54, Jeju, Korea, Aug. 18-22, 2008, 5 pages.

Lte, "$3^{rd}$ Generation Partnership Project; Technical Specification Group Radio Access Network; Further Advancements for E-UTRA Physical Layer Aspects" (Release 9) 3GPP TR 36.814, V0.4.1, Feb. 2009, 31 pages.

Dorot et al., Program product, program article—Program (or program package) intended for selling or transferring for operation by other persons Modern computer lexis dictionary, BHV-Petersburg, 2001, p. 339.

Nokia Siemens Networks, "CRC Mask Selection for PBCH" Agenda Item 6.2, 3GPP TSG RAN WG1 #52 Meeting. Sorrento, Italy, Feb. 11-15, 2008, R1-081073.

Texas Instruments, "Common Reference Symbol Mapping/Signalling for 8 Transmit Antenna" Agenda Item 11, 3GPP TSG RAN1 #54bis. Prague, Czech Republic, Sep. 29-Oct. 3, 2008. R1-083532.

Nokia Siemens Networks, "Issues with PBCH-based Blind Antenna Configuration Detection" Agenda Item 6.1.8, 3GPP TSG RAN WG1 #51bis Meeting. Sevilla, Spain, Jan. 14-18, 2008. R1-080324.

$3^{rd}$ Generation Partnership Project; Technical Specification Group Radio Access Network; Evolved Universal Terrestrial Radio Access (E-UTRA); Physical Channels and Modulation (Release 8) 3GPP TS36.211, Sep. 2008.

"$3^{rd}$ Generation Partnership Project; Technical Specification Group Radio Access Network; Evolved Universal Terrestrial Radio Access (E-UTRA); Multiplexing and Channel Coding (Release 8)" 3GPP TS36.212. Sep. 2008.

"$3^{rd}$ Generation Partnership Project; Technical Specification Group Radio Access Network; Evolved Universal Terrestrial Radio Access (E-UTRA); Physical Layer Procedures (Release 8)" 3GPP TS36.213. Sep. 2008.

* cited by examiner

APPARATUS, SYSTEM, AND METHOD FOR SIGNALING A QUANTITY OF ANTENNA PORTS IN A WIRELESS COMMUNICATION SYSTEM

CROSS-REFERENCE TO RELATED APPLICATIONS

This application is a continuation of U.S. patent application Ser. No. 13/165,544, filed on Jun. 21, 2011, which is a continuation of International Application No. PCT/CN2009/072516, filed on Jun. 29, 2009, which claims priority to International Application No. PCT/CN2008/073631, filed on Dec. 22, 2008, all of which are hereby incorporated by reference in their entireties.

TECHNICAL FIELD

The present disclosure relates to a method in a wireless communication system for signalling number of antenna ports, or more particularly to a method according to the preamble of claim 1. Furthermore, the disclosure also relates to a transmit node and a receive node, and methods thereof.

BACKGROUND

In a wireless cellular communication system, one or multiple Downlink (DL) Common Reference Signals (CRSs) may be used for channel measurements, or for coherent demodulation and channel measurements, for a mobile terminal in a given cell. A mobile terminal is also denoted as a User Equipment (UE) in some wireless communication systems. Each CRS defines a so-called antenna port in a given cell and a common way to implement antenna ports is to associate an antenna port with a physical transmit antenna.

The Reference Signals (RSs) of different antenna ports should be orthogonal to each other to allow interference-free identification of corresponding propagation channel coefficients, i.e. the propagation channel from each transmit antenna to each receive antenna. The RSs are usually cell-specific to minimize interference between RSs in different cells. Without loss of generality, antenna ports are defined by CRS or cell-specific CRS throughout this document. Cell specific CRS implies that they are used by multiple UEs in a cell to measure the channel from each antenna port. Antenna ports may also be user specific, which means that they are used for measurements and/or demodulation by a specific single UE.

The CRSs are transmitted on exclusively reserved resources of a cell, such as time and frequency Resource Elements (RE), codes, etc. Data is not transmitted on these reserved resources to avoid interference with RSs, which would hamper the estimation of the channel propagation coefficients from that antenna port.

In order to be able to use DL CRSs properly and to perform standard communication with a base station, such as a eNB, the number of antenna ports used for DL channel measurements and/or DL transmission is very important information that a UE needs to know. After a UE obtain information about the number of antenna ports used in a cell, the UE will know which transmission mode is used for each physical channel, and which resources that are used for data transmission and which that are used for DL CRS. This is important information to avoid that received data is punctured by CRSs, since if a UE is not aware of all CRSs in radio resources, it will assume reception of data on those resources where there actually is a CRS transmission, and this will degrade the performance of data reception due to the interference from the CRSs.

Furthermore, knowing the number of CRSs is also important to measure multiple channels using CRSs and to detect physical channels, etc. In the Long Term Evolution (LTE) Release-8 (Rel-8) standard, the information about number of antenna ports is embedded in the signal transmitted on a Physical Broadcast Channel (PBCH). After successful cell search procedure, the UE will obtain time and frequency synchronization with a cell, as well as the cell Identity (ID) of the cell; and then the UE begins to detect the PBCH to obtain cell-specific information and the number of antenna ports.

In the LTE Rel-8 standard, three types of cell-specific CRSs are supported defining: one, two and four antenna ports (3GPP TS 36.211 v8.4.0). The number of antenna ports in a cell decides the maximum number of Multiple Input Multiple Output (MIMO) transmission layers supported by a eNB in said cell. For instance, if there are four antenna ports in a cell, up to four MIMO layers transmission can be supported by the eNB. The information about the number of antenna ports is embedded into the signal transmitted on the PBCH by using different Cyclic Redundancy Check (CRC) masks to indicate the number of antenna ports. As a UE has no prior information about the number of used antenna ports in a cell, i.e. the used CRC mask of the transport block of the PBCH, the UE has to make blind detection of that information, which means that it has to check all possible CRC masks and select the mask that is the most probable conditioned on the received PBCH signal.

The operation of embedding information about the number of antenna ports into PBCH at transmitter and the corresponding blind detection of PBCH at receiver for a LTE Rel-8 system will be described in the following.

Firstly, at the transmitter, the entire transport block bits of PBCH $a_0, a_1, \ldots a_{A-1}$ is used to calculate the CRC parity bits $p_0, p_1, \ldots p_{L-1}$, where A is the size of the transport block (i.e. the number of information bits) and L is the number of CRC parity bits which is set to 16 in the LTE Rel-8 standard. Secondly, according to the antenna port configuration of the cell, the CRC parity bits are scrambled by a sequence having length 16, $x_0'', x_1'', \ldots x_{15}''$ corresponding to a number of antenna ports n, where n=1, 2 or 4. After scrambling, the masked CRC parity bits will be $c_0, c_1, \ldots c_{15}$, where $c_i = (p_i + x_i'') \mod 2$, i=0, 1, ..., 15. The mapping relation between the three scrambling sequences and the number of antenna ports according to the LTE standard is shown in Table 1 below.

TABLE 1

CRC mask sequences for PBCH in LTE Rel-8

| Number of antenna ports | CRC mask sequences |
|---|---|
| 1 | <0, 0, 0, 0, 0, 0, 0, 0, 0, 0, 0, 0, 0, 0, 0, 0> |
| 2 | <1, 1, 1, 1, 1, 1, 1, 1, 1, 1, 1, 1, 1, 1, 1, 1> |
| 4 | <0, 1, 0, 1, 0, 1, 0, 1, 0, 1, 0, 1, 0, 1, 0, 1> |

Then, the masked CRC parity bits are attached to the tail of the transport block bits of the PBCH to obtain the information bits to be transmitted as $a_0, a_1, \ldots, a_{A-1}, c_0, c_1, \ldots c_{15}$.

Finally, a set of operations including channel coding, rate matching, modulation and resources mapping are performed on the information bits $a_0, a_1, \ldots, a_{A-1}, c_0, c_1, \ldots c_{15}$.

In the case of one antenna port, the modulation symbols are directly mapped to the reserved resources on antenna port 0; in the case of two antenna ports, a transmit diversity scheme known as Space Frequency Block Coding (SFBC) is performed on the modulation symbols, and the output of the SFBC is mapped to the reserved resources on antenna port 0 and 1, respectively; in the case of four antenna ports, SFBC combined with Frequency Switching Transmit Diversity (FSTD) is performed on the modulation symbols, and the output of SFBC+FSTD is mapped to the reserved resources on antenna port 0, 1, 2 and 3, respectively. It should be observed from the above description that the information about the number of antenna ports is implicitly embedded into the PBCH.

Figure 1:
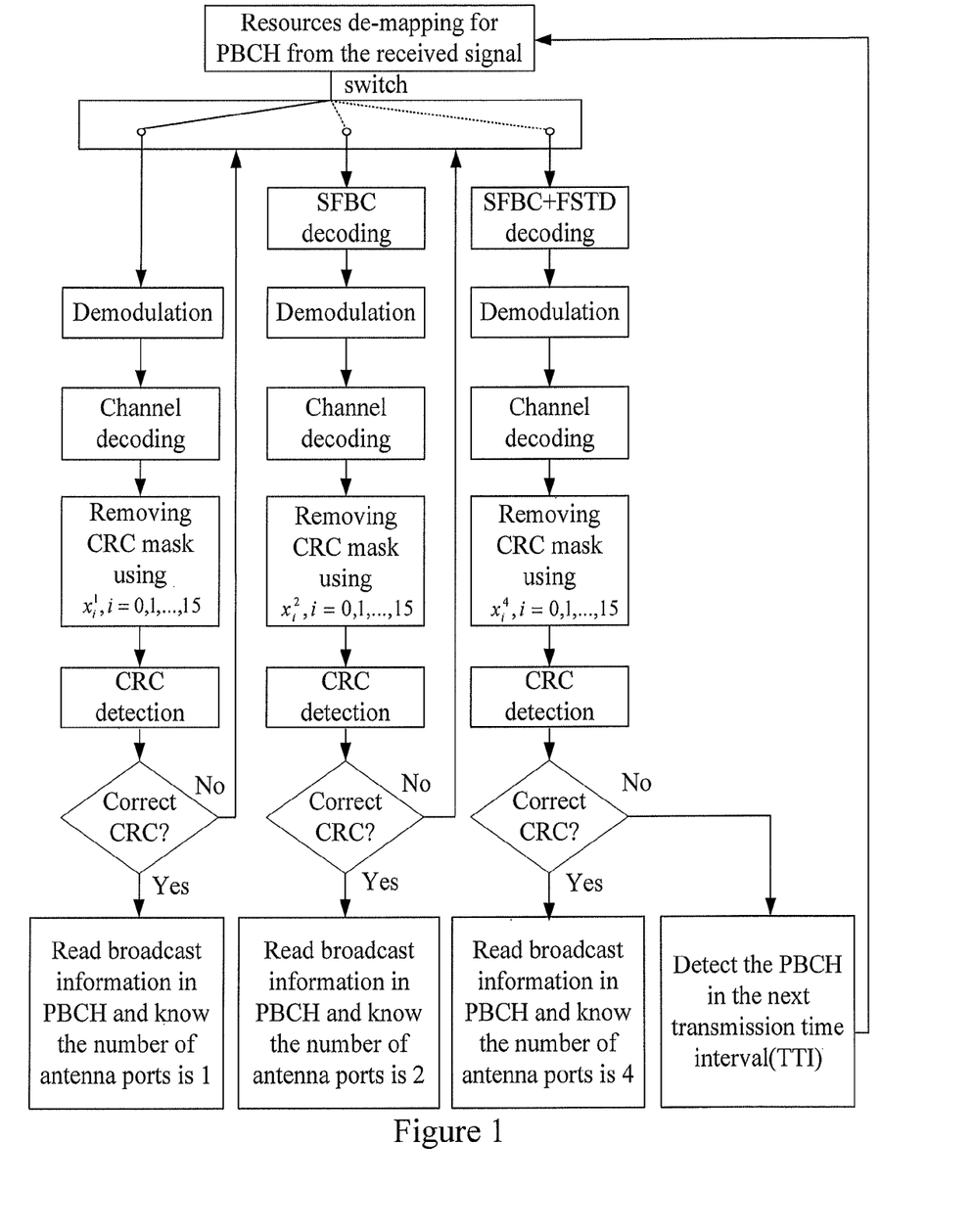
FIG. 1 shows the procedure of blind detection of PBCH in LTE.

At the receiver, the corresponding inverse operations to find the number of antenna ports are done by a UE who is accessing to the cell. As the UE knows that there are three hypothesises possible regarding the number of antenna ports (i.e. one, two or four antenna ports) the UE performs blind detection of the PBCH, which is illustrated in FIG. 1. In the procedure of blind detection, SFBC or SFBC+FSTD decoding, demodulation, channel decoding and CRC detection are all standard operations, so the details of them will not be further described, but the operation of removing the CRC mask will be explained in the following disclosure.

Assuming that the output of channel decoding is $\hat{a}_0$, $\hat{a}_1, \ldots, \hat{a}_{A-1}, \hat{c}_0, \hat{c}_1, \ldots \hat{c}_{15}$, where the last 16 bits of information $\hat{c}_0, \hat{c}_1, \ldots \hat{c}_{15}$ are the CRC parity bits scrambled with a CRC mask corresponding to information about the number of antenna ports, as mentioned above. When blind detection of the PBCH is performed, the CRC parity bits are de-scrambled with an assumed CRC mask (i.e. removing the CRC mask) in the following way:

$$\tilde{c}_i = (\hat{c}_i + x_i^n) \bmod 2$$

where i=0, 1, ..., 15;
n is the number of antenna ports,
$x_i^n$ is the defined CRC mask corresponding to n antenna ports If the assumed CRC mask is the same as the actual CRC mask used at transmitter, the above operation will completely remove the CRC mask embedded into CRC parity bits, and the probability of correct detection is increased.

As mentioned, in the LTE Rel-8 system up to four antenna ports can be supported on the DL. The LTE-Advanced (LTE-A) system of Release 10 (Rel-10) and beyond are supposed to be an extension of LTE system in which up to eight layers transmission (possibly even more layers for releases beyond Rel-10) will be supported to further increase system performance, such as peak data rate, cell average spectrum efficiency, etc (3GPP TR 36.814 v1.0.0). In order to support up to eight layers transmission more antenna ports than the antenna ports supported in LTE Rel-8 must be defined in a LTE-A communication system.

In addition, to fulfil LTE-A backwards compatibility requirement, it should still be possible for a LTE-A cell to also serve LTE UEs. In order to enable LTE UEs to operate in a LTE-A system, the antenna ports defined in LTE should also be supported in a LTE-A system, i.e. n number of LTE CRSs should also exist in a LTE-A system, where n=1, 2 or 4; and LTE UEs use LTE CRSs for coherent demodulation and channel measurement as in the LTE system, while LTE-A UEs may also use these LTE CRS for demodulation of the control channels, such as PBCH and Physical Downlink Control Channel (PDCCH).

Hence, in a LTE-A system there will be a number of LTE antenna ports used for transmitting LTE data/control and/or LTE-A control information; in addition, it is also possible to define a number of additional antenna ports used only for supporting LTE-A data transmission. For all antenna ports in a LTE-A system, the new defined additional antenna ports are denoted as LTE-A antenna ports, and the number of LTE-A antenna ports could be zero. Therefore, a communication system which can serve both LTE UEs and LTE-A UEs is needed. Also, since the number of LTE and LTE-A antenna ports may be different in a LTE-A cell, a question is how to signal the existence of LTE-A antenna ports to LTE-A UEs in way that is transparent to the reception of the number of LTE antenna ports.

It is thus clear that a LTE-A eNB may need to enable additional CRSs (antenna ports) for measurements and/or demodulation compared to the antenna ports defined by LTE CRSs (i.e. n=1, 2 or 4). Up to eight additional antenna ports (CRSs) may be needed for LTE-A UEs in Rel-10. These additional CRSs are denoted Channel State Information-RSs (CSI-RSs). It is thus another question how to signal the number of LTE-A antenna ports or the number of CSI-RS to LTE-A UEs in way that is transparent to LTE UEs.

Therefore, a signalling method which is backwards compatible to enable LTE UEs to obtain the number of LTE antenna ports, while the signalling of LTE-A antenna ports should be transparent to LTE UEs is needed in the art.

SUMMARY

An object of the present disclosure is to provide a method for signalling information about a number of antenna ports a transmit node includes. Another object of the disclosure is to provide a method which solves the problem of backwards compatibility described above. Yet another object of the disclosure is to provide a solution to the above problem which is simple and easy to implement in a wireless communication system.

According to an aspect of the disclosure the aforementioned objects are achieved by a method in a wireless communication system for signalling number of antenna ports which a transmit node includes. According to the method a communication signal is transmitted carrying information on number of at least one antenna port of said transmit node, wherein the information on said number of at least one antenna port is partitioned and provided distributed over at least two predefined parts of said communication signal.

According to another aspect of the disclosure the aforementioned objects are achieved by a method in a transmit node in a wireless communication system for signalling number of antenna ports which said transmit node includes. According to the method, said transmit node transmits a communication signal carrying information on number of at least one antenna port of said transmit node, wherein the information on said number of at least one antenna port is partitioned and provided distributed over at least two predefined parts of said communication signal.

According to an embodiment of the above-mentioned aspect of the disclosure, said wireless communication system is a LTE-A communication system and said transmit node is a base station or a relay station According to yet another aspect of the disclosure the aforementioned objects are achieved by a method in a receive node in a wireless communication system for receiving signals indicating number of antenna ports which a transmit node includes. According to the method, said receive node receives a communication signal carrying information on number of at least one antenna port of said transmit node, wherein the information on said number of at least one antenna port is partitioned and provided distributed over at least two predefined parts of said communication signal.

According to an embodiment of the above-mentioned aspect of the disclosure, said wireless communication system is a LTE-A communication system and said receive node is a mobile station such as a UE.

According to yet another aspect of the disclosure the aforementioned objects are achieved by a transmit node for signalling number of antenna ports which said transmit node includes. Said transmit node is arranged to provide and transmit a communication signal in said wireless communication system carrying information on number of at least one antenna port of said transmit node, wherein the information on said number of at least one antenna port is partitioned and provided distributed over at least two predefined parts of said communication signal.

According to yet another aspect of the disclosure the aforementioned objects are achieved by a receive node for receiving signals indicating number of antenna ports which a transmit node includes. Said receive node is arranged to receive and process a communication signal carrying information on number of at least one antenna port of said transmit node, wherein the information on said number of at least one antenna port is partitioned and provided distributed over at least two predefined parts of said communication signal.

The transmit node and the receive node may further be configured in accordance with the different embodiments of the methods above.

The present disclosure provides an alternative method for signalling a number of antenna ports which a transmit node includes. The disclosure also makes it possible for LTE-A UEs to obtain information about the antenna port configuration for a transmit node (e.g. a eNB or a relay node) for performing communication with the same, and at the same time information for LTE-A UEs is transparent to LTE UEs and has no impact on the LTE UEs. Therefore, a solution to the backwards compatibility problem described above is also provided by the disclosure.

Other advantages and applications of the present disclosure will be apparent from the following detailed description of the disclosure.

BRIEF DESCRIPTION OF THE DRAWINGS

The appended drawings are intended to clarify and explain the present disclosure in which.

DETAILED DESCRIPTION OF EMBODIMENTS

The present disclosure relates to a method in a wireless communication for signalling information about a number of antenna ports a transmit node includes, where the transmit node can be a base station, eNB, relay station or a relay node. According to an embodiment of the present disclosure information about the number of deployed DL antenna ports in LTE-A system is classified into type I and type II information. Type I information indicates the number of LTE antenna ports, and type II information indicates the number of antenna ports defined by LTE-A CSI-RS, or also indicates the total number of antenna ports which are defined by both LTE CRSs and LTE-A CSI-RSs.

Thus, type I and type II information will indicate information about a number of different types of antenna ports. In the LTE-A system, LTE UEs only need to receive type I information to know the exact number of LTE antenna ports, and then use the obtained antenna port information to perform communication with a LTE-A eNB; while LTE-A UEs will receive both type I and type II information for different purposes, i.e. the type I information is used for demodulating one or more control channels, and the type II information is used for channel measurement to support high layer transmission.

Therefore, a method in a wireless communication system for signalling a number of antenna ports which a transmit node includes is presented. According to the method, a communication signal is transmitted carrying information about a number of at least one antenna port of the transmit node. The information about the number of at least one antenna port is partitioned and provided distributed over at least two predefined parts of the communication signal.

The communication signal is according to the disclosure a number of bits transmitted on at least one physical channel, and the information about the number of antenna port is partitioned into at least two parts, which are distributed in different parts among said number of bits of the communication signal. In this manner, the antenna port information is embedded into the communication signal, i.e. the communication signal carries the antenna port information. At least one part of the communication signal should be identified by LTE UEs, and at least one another part of the communication signal should be transparent to LTE UEs, which in one embodiment of the disclosure corresponds to a first and second predetermine part of the communication signal, respectively.

To support backwards compatibility and achieve transparent operation of LTE UEs in LTE-A cells, type I information corresponding to the first partitioned part of the information about the number of antenna ports can in another embodiment of the disclosure be conveyed using the same principle as in LTE cells, and it is detectable both to LTE and LTE-A UEs. Thus, type I information is implicitly transmitted through scrambling the CRC bits of a Broadcast Channel (BCH) transport block transmitted on a PBCH with a CRC mask sequence corresponding to type I information, and the PBCH will be transmitted using at most four LTE antenna ports, wherein the BCH transport block, including the scrambled CRC bits, corresponds to the communication signal, and the scrambled CRC bits correspond to the first predefined part of the communication signal. The question regarding how many antenna ports that are used for transmitting the PBCH depends on the configuration of LTE antenna ports in a LTE-A cell.

After detecting type I information, the LTE UE will continue operation according to the identified number (one, two or three) of antenna ports in that cell. However, an LTE-A UE also has to decode type II information corresponding to the second partitioned part of the information about the number of antenna ports before it can obtain the exact information about the number of deployed antenna ports the LTE-A UE may use, since a LTE-A UE has to find out the number of antenna ports defined by LTE-A CSI-RSs for channel measurement. Therefore, the type II information is detectable only to LTE-A UEs.

In the LTE Rel-8 system, the size of a BCH transport block transmitted on a PBCH is 24 bits, and there are 10 spare bits which are reserved for future communication system. The 10 spare bits are set to zero, and LTE UEs will ignore the 10 spare bits to guarantee backwards/forward compatibility, i.e. LTE UEs will not interpret the 10 spare bits regardless of what kind of information that is embedded into the 10 spare bits. Thus, one or more of the 10 spare bits or states represented by the 10 bits can be used to indicate type II information, and there will not be any impact on LTE UEs PBCH detection and the interpretation of the information bits on the BCH, wherein the one or more of the 10 spare bits in BCH transport block correspond to the second predefined part of the communication signal. Regarding how many bits or states that are needed for indicating the number of antenna ports defined by LTE-A CSI-RS depends on the definition of LTE-A CSI-RS. After LTE-A UEs successfully detect the PBCH, i.e. the CRC detection is correct, type I information will be obtained, and then the LTE-A UEs further detect the content of the BCH transport block transmitted on the PBCH to obtain the type II information. In other words, if the PBCH is correctly detected by LTE-A UEs they will know the exact number of antenna ports. In this way, LTE UEs and LTE-A UEs can obtain their desired antenna port information, respectively, and this signalling method has no impact on LTE UE performance, and therefore transparent to LTE UEs, i.e. the requirement of backwards compatibility is achieved.

In the following further embodiments of the disclosure in terms of definition of LTE-A CSI-RSs and the relation between LTE CRSs and LTE-A CSI-RSs are disclosed.

Embodiment A

When the maximum number of supported layers by a LTE-A eNB (or base station) to LTE-A UEs is eight, the number of LTE-A antenna ports will be eight. The eight LTE-A antenna ports are defined by eight LTE-A CSI-RSs for either channel measurement, or for both channel measurement and demodulation to support eight layers transmission. Furthermore, the eight LTE-A CSI-RSs are independent of LTE CRSs, and the number of LTE antenna ports defined by LTE CRSs can be configurable.

The number of configured LTE antenna ports in a LTE-A cell can be one, two or four based on the actual situation of the system. For instance, there may be more LTE UEs to be supported at the beginning stage of a LTE-A system, and hence e.g. four LTE antenna ports can be configured to support LTE UEs; as evolution of system or time passing, there may be more and more LTE-A UEs in the system instead of LTE UEs, so it may not be necessary to configure four LTE antenna ports in this situation for reducing RS overhead.

In the case when a LTE-A eNB supports up to four layers transmission for LTE-A UEs, the number of LTE-A antenna ports will be four and the number of LTE antenna ports is four. In this case, no new LTE-A CSI-RSs are defined and LTE-A UEs will use the four LTE antenna ports to perform both channel measurement and demodulation.

If the maximum supported layers for LTE-A UEs by a LTE-A eNB is one or two, there is similar antenna port configuration as in the case for up to four layers transmission, i.e. there is no new LTE-A CSI-RSs in addition to LTE antenna ports. The antenna port configuration in this embodiment is summarized in Table 1.

TABLE 1

Antenna port configuration in LTE-A

| Maximum of layers supported for LTE-A UEs by a LTE-A eNB | Number of LTE antenna ports defined by LTE CRS | Number of antenna ports defined by LTE-A CSI-RS |
| --- | --- | --- |
| 1 | 1 | 0 |
| 2 | 2 | 0 |
| 4 | 4 | 0 |
| 8 | 1 | 8 |
| 8 | 2 | 8 |
| 8 | 4 | 8 |

Based on Table 1, one bit or two states can be used to indicate type II information, i.e. the number of antenna ports defined by LTE-A CSI RSs is zero or eight. For example, the type II is one bit information, where '0' could indicate that there is no LTE-A CSI-RS in the LTE-A cell, and LTE-A UEs should use the LTE antenna ports for channel measurement and demodulation, and '1' could indicate that there are eight LTE-A CSI-RSs in addition to a number of LTE CRSs indicated by type I information.

TABLE 1.1

Encoding type II information

| Type II information | Number of antenna ports defined by LTE-A CSI-RS |
| --- | --- |
| '1' | 8 |
| '0' | 0 |

Embodiment B

When the maximum number of supported layers for LTE-A UEs by LTE-A eNB is one, two or four, the antenna port configuration is the same as in embodiment 1 above. If the maximum supported layers by LTE-A eNB is eight, the number of LTE antenna ports is assumed to be n, where n=1, 2, or 4, and the new added LTE-A CSI-RSs is 8-n. LTE-A UEs use the combination of LTE CRSs and LTE-A CSI-RSs to do channel measurement, i.e. 8-n number of CSI-RSs and n number of LTE CRSs. The possible antenna port configurations are summarized in Table 2.

TABLE 2

Antenna port configurations in LTE-A

| Maximum of layers supported for LTE-A UEs by a LTE-A eNB | Number of LTE antenna ports defined by LTE CRS | Number of antenna ports defined by LTE-A CSI-RS |
| --- | --- | --- |
| 1 | 1 | 0 |
| 2 | 2 | 0 |
| 4 | 4 | 0 |
| 8 | 1 | 7 |
| 8 | 2 | 6 |
| 8 | 4 | 4 |

In this embodiment there are two possible solutions to indicate the number of LTE-A antenna ports. Alternative 1: two bits or four states are needed to represent type II information. For example, type II information indicated by two bits: '00', '01', '10' and '11' represent that the number of LTE-A CSI-RSs is 0, 4, 6 and 7, respectively, which is shown in Table 2.1.

TABLE 2.1

Encoding type II information bits

| Type II information | Number of antenna ports defined by LTE-A CSI-RS |
| --- | --- |
| '00' | 0 |
| '01' | 4 |
| '10' | 6 |
| '11' | 7 |

Alternative 2: only one bit is used to indicate type II information. Given that the number of LTE antenna ports n is detected, the number of LTE-A antenna ports has only two possible values, i.e. 0 and 8-n, which can be indicated by one bit as shown in Table 2.2 below.

TABLE 2.2

Encoding type II information bits

| Type II information | Number of antenna ports defined by LTE-A CSI-RS |
|---|---|
| '1' | 8-n |
| '0' | 0 |

Embodiment C

Assuming the maximum number of supported layers for LTE-A UEs at a LTE-A eNB is N and the number of configured LTE antenna ports is M, where M<=N, and M=1, 2, or 4. When M<N, the number of LTE-A CSI-RS will be N, otherwise it will be zero. This type of antenna port configuration is illustrated in Table 3.

TABLE 3

Antenna port configurations in LTE-A

| Maximum of layers for LTE-A UEs supported by a LTE-A eNB | Number of LTE antenna ports defined by LTE CRS | Number of antenna ports defined by LTE-A CSI-RS |
|---|---|---|
| 1 | 1 | 0 |
| 2 | 1 | 2 |
|   | 2 | 0 |
| 4 | 1 | 4 |
|   | 2 | 4 |
|   | 4 | 0 |
| 8 | 1 | 8 |
| 8 | 2 | 8 |
| 8 | 4 | 8 |

If the number of antenna ports defined by LTE-CSI RSs is zero, it means that LTE-A UEs will use LTE antenna ports to measure the channel for supporting multiple layers transmission. The type II information can be encoded with two bits as shown in Table 3.1 below.

TABLE 3.1

Encoding type II information bits

| Type II information | Number of antenna ports defined by LTE-A CSI-RS | | |
|---|---|---|---|
|  | Case 1 | Case 2 | Case 3 |
| '00' | 0 | 0 | 0 |
| '01' | 2 | x | x |
| '10' | 4 | 4 | x |
| '11' | 8 | 8 | 8 |

The three cases represent that the number of LTE antenna ports is one, two and four, respectively. The symbol 'x' in Table 3.1 indicates an invalid state.

Embodiment D

Following the assumption in the embodiment above, if M<N, the number of LTE-A CSI-RSs will be N-M, otherwise it will be zero.

TABLE 4

Antenna port configurations in LTE-A

| Maximum of layers for LTE-A UEs supported by a LTE-A eNB | Number of LTE antenna ports defined by LTE CRS | Number of antenna ports defined by LTE-A CSI-RS |
|---|---|---|
| 1 | 1 | 0 |
| 2 | 1 | 1 |
|   | 2 | 0 |
| 4 | 1 | 3 |
|   | 2 | 2 |
|   | 4 | 0 |
| 8 | 1 | 7 |
| 8 | 2 | 6 |
| 8 | 4 | 4 |

When the maximum supported layers for LTE-A UEs by LTE-A eNB is equal to the number of LTE antenna ports, no LTE-A CSI will be defined and LTE-A UEs will use LTE antenna ports for channel measurement and demodulation. Otherwise, a number of additional LTE-A CSIs is defined and the combination of LTE CRSs and LTE-A CSIs is used by LTE-A UEs for channel measurement. In this case, LTE-A antenna ports include both LTE antenna ports and antenna ports defined by LTE-A CSI. The type II information can be encoded as shown in Table 4.1.

TABLE 4.1

Encoding type II information bits

| Type II information | Number of antenna ports defined by LTE-A CSI-RS | | |
|---|---|---|---|
|  | Case 1 | Case 2 | Case 3 |
| '00' | 0 | 0 | 0 |
| '01' | 1 | 2 | 4 |
| '10' | 3 | 6 | x |
| '11' | 7 | x | x |

It should be noted that the interpretation of the type II information is different in different cases, i.e. the number of configured LTE antenna ports. LTE-A UEs will interpret the type II information depending on the detected type I information.

Embodiment E

In this embodiment, the only difference from the above embodiment is that eight LTE-A CSIs are defined when the maximum of layers supported by LTE-A eNB is eight.

TABLE 5

Antenna port configuration in LTE-A

| Maximum of layers for LTE-A UEs supported by a LTE-A eNB | Number of LTE antenna ports defined by LTE CRS | Number of antenna ports defined by LTE-A CSI-RS |
|---|---|---|
| 1 | 1 | 0 |
| 2 | 1 | 1 |
|   | 2 | 0 |
| 4 | 1 | 3 |
|   | 2 | 2 |
|   | 4 | 0 |
| 8 | 1 | 8 |
| 8 | 2 | 8 |
| 8 | 4 | 8 |

The type II information can in this embodiment be encoded with two bits of information or four states. In this embodiment, we assume that four states of the 10 sparse PBCH bits are used to represent the type II information.

TABLE 5.1

Encoding of type II information bits

| Type II information | Number of antenna ports defined by LTE-A CSI-RS | | |
|---|---|---|---|
| | Case 1 | Case 2 | Case 3 |
| '0000000001' | 0 | 0 | 0 |
| '0000000010' | 1 | 2 | x |
| '0000000011' | 3 | x | x |
| '0000000100' | 8 | 8 | 8 |

Embodiment F

In order to support LTE-A UEs multiple layers transmission, a number of LTE-A CSI are defined, which is equal to the maximum supported layers by LTE-A eNB in this case. There are two embodiments following this principle, The number of LTE antenna ports is configurable only when there are eight LTE-A CSI.

The number of LTE antenna ports is configurable for any number of LTE-A CSI.

Embodiment F1

One bit type II information can be used to indicate the antenna port configuration shown in Table 6.1.

TABLE 6.1

The number of LTE antenna ports is only configurable when there are eight LTE-A CSI-RSs

| Maximum of layers for LTE-A UEs supported by a LTE-A eNB | Number of LTE antenna ports defined by LTE CRS | Number of antenna ports defined by LTE-A CSI-RS |
|---|---|---|
| 1 | 1 | 1 |
| 2 | 2 | 2 |
| 4 | 4 | 4 |
| 8 | 1 | 8 |
| 8 | 2 | 8 |
| 8 | 4 | 8 |

TABLE 6.1.1

Encoding type II information bits

| Type II information | Number of antenna ports defined by LTE-A CSI-RS | | |
|---|---|---|---|
| | Case 1 | Case 2 | Case 3 |
| '0' | 1 | 2 | 4 |
| '1' | 8 | 8 | 8 |

Embodiment F2

TABLE 6.2

The number of LTE antenna ports is configurable

| Maximum of layers for LTE-A UEs supported by a LTE-A eNB | Number of LTE antenna ports defined by LTE CRS | Number of antenna ports defined by LTE-A CSI-RS |
|---|---|---|
| 1 | 1 | 1 |
| 2 | 1 | 2 |
| | 2 | 2 |
| 4 | 1 | 4 |
| | 2 | 4 |
| | 4 | 4 |
| 8 | 1 | 8 |
| 8 | 2 | 8 |
| 8 | 4 | 8 |

In this embodiment of the disclosure, the type II information is encoded as two bits.

TABLE 6.2.1

Encoding type II information bits

| Type II information | Number of antenna ports defined by LTE-A CSI-RS | | |
|---|---|---|---|
| | Case 1 | Case 2 | Case 3 |
| '00' | 1 | x | x |
| '01' | 2 | 2 | x |
| '10' | 4 | 4 | 4 |
| '11' | 8 | 8 | 8 |

Embodiment G

When the maximum of layers for LTE-A UEs supported by LTE-A eNB is one (or two), there will be one (or two) LTE antenna ports which are used for LTE-A channel measurement and demodulation, and no new LTE CSI-RSs are defined; the number of LTE antenna ports is configurable and some new LTE-A CSI-RSs are defined shown in Table below.

TABLE 7

Antenna port configuration in LTE-A

| Maximum of layers for LTE-A UEs supported by a LTE-A eNB | Number of LTE antenna ports defined by LTE CRS | Number of antenna ports defined by LTE-A CSI-RS |
|---|---|---|
| 1 | 1 | 0 |
| 2 | 2 | 0 |
| 4 | 1 | 4 |
| | 2 | 4 |
| | 4 | 0 |
| 8 | 1 | 8 |
| 8 | 2 | 8 |
| 8 | 4 | 8 |

In this case, three states are sufficient to represent type II information as shown in Table 7.1.

TABLE 7.1

Encoding type II information bits

| Type II information | Number of antenna ports defined by LTE-A CSI-RS |
|---|---|
| '0000000001' | 0 |
| '0000000010' | 4 |
| '0000000011' | 8 |

Figure 2:
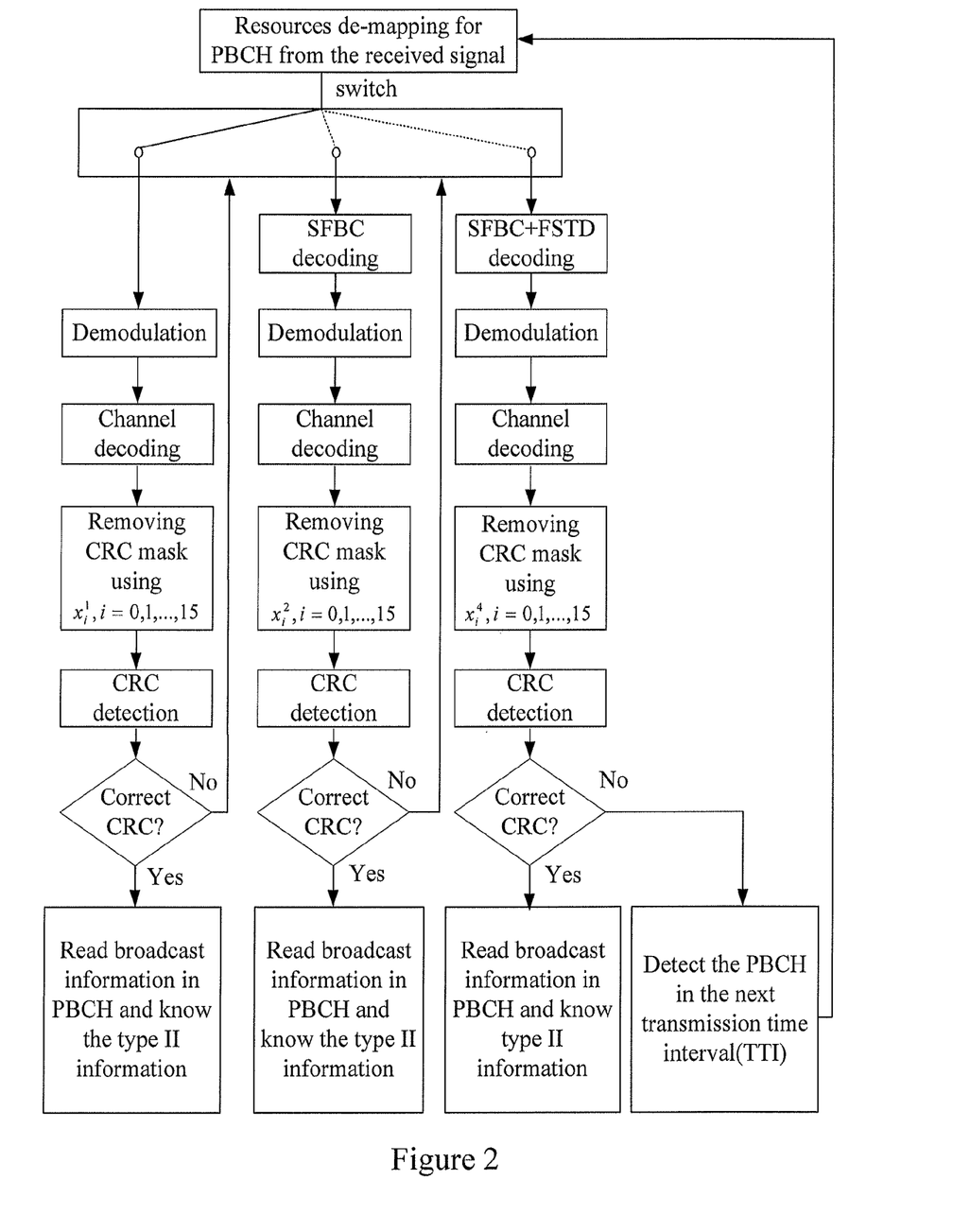
FIG. 2 shows the procedure of blind detection of PBCH in LTE Advanced (LTE-A)

An example of how transmission of information about a number of antenna ports that a transmit node includes may be implemented in a LTE-A communication system is described below, in which the antenna port configuration information is transmitted through a LTE-A PBCH. The blind detection of LTE-A PBCH is illustrated in FIG. 2.

The transmitting procedure of a LTE-A PBCH involves the steps of:

Using the entire transport block of LTE-A PBCH $a_0, a_1, \ldots, a_{A-1}$ (in which one or more explicit bits corresponding to type II information indicate the number of antenna ports defined by LTE-A CSI-RS) to calculate the CRC parity bits $p_0, p_1, \ldots p_{L-1}$, where A and L are the value of transport block size and CRC bits size, respectively.

Scrambling the calculated CRC parity bits $p_0, p_1, \ldots p_{L-1}$ with a CRC mask $x_0^4, x_0^4, \ldots x_{15}^4$ corresponding to type I information about the number of LTE antenna ports, i.e. $c_i = (p_i + x_i^4) \mod 2$, $i=0, 1, \ldots, 15$.

Attaching the scrambled CRC $c_0, c_1, \ldots c_{15}$ to the transport block of LTE-A PBCH $a_0, a_1, \ldots, a_{A-1}$ for obtaining $a_0, a_1, \ldots, a_{A-1}, c_0, c_1, \ldots c_{15}$.

Performing channel coding, rate matching, and modulation on the information bits $a_0, a_1, \ldots, a_{A-1}, c_0, c_1, \ldots c_{15}$.

Performing spatial encoding on the modulation symbols such as SFBC or SFBC+FSTD depending on the number of LTE antenna ports.

Mapping the output of the above step onto the reserved resources for PBCH on a number of LTE antenna ports.

According to yet another embodiment of the disclosure, in addition to transmit the type II information in the BCH transport block, the type II information can also be transmitted on other channels, such as Physical Downlink Shared Channel (PDSCH). Dynamic Broadcast Channel (DBCH) is another type of broadcast transport channel which is mapped onto the PDSCH on the physical layer. This type of PDSCH is transmitted in a predefined sub-frame, and all active UEs in a cell will receive this type of PDSCH to obtain further system information in addition to broadcast information conveyed on the PBCH. In a LTE-A system, some new information bits can be defined in DBCH, which are only valid for LTE-A UEs, e.g. several bits in DBCH are used to indicate the number of antenna ports defined by LTE-A CSI-RS. In this case, the communication signal corresponds to a BCH transport block including scrambled CRC bits and DBCH transport block mapped onto PDSCH together, and the first and second predefined parts of the communication signal correspond to scrambled CRC bits of the BCH and the information bits of the DBCH transport block, respectively.

Before a LTE-A UE obtains the number of LTE-A antenna ports, it can only know the number of LTE antenna ports through detecting PBCH. In order to detect the PDSCH on which DBCH containing type II information is mapped, this PDSCH must be transmitted on the configured LTE antenna ports which are indicated by type I information, otherwise LTE-A UE can not detect the PDSCH. Thus, the procedure is that a LTE-A UE firstly detects the PBCH to get the number of LTE antenna ports, and then go to the predefined sub-frame to detect the special PDSCH carrying DBCH information. After the detection of the PDSCH, the LTE-A UE will obtain the number of LTE-A antenna ports, and then can switch to LTE-A mode.

The present disclosure also relates to a transmitting apparatus and a receiving apparatus configured according to the different embodiments of the method above.

Figure 3:
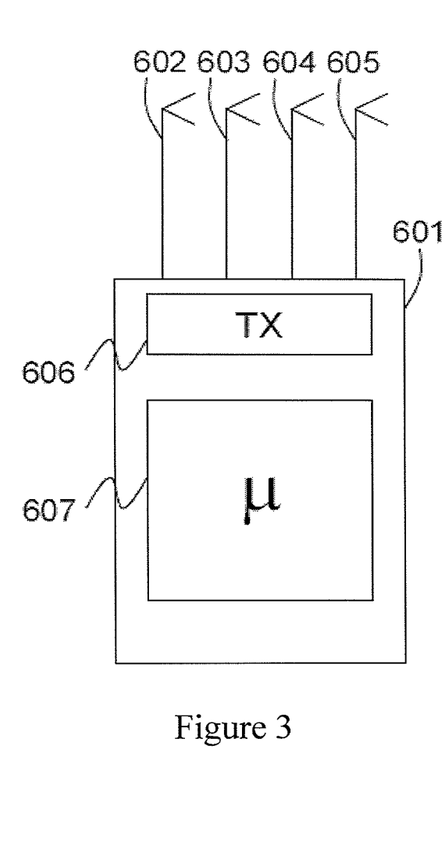
FIG. 3 shows a principal structure of an exemplary transmitting apparatus according to the disclosure.

FIG. 3 shows a principle structure of an exemplary transmitting apparatus (601) for a wireless communications system according to the present disclosure. The transmitting apparatus includes transmission circuitry (TX, 606) having one or more antenna ports for transmission of communication signals over one or more antennas (602-605). Prior to transmission, signals carrying information on a number of antenna ports are processed in a processing circuitry (μ, 607). Different signal parts are predefined preferably in memory devices of the transmitting apparatus (601) included in or connected to the processing circuitry (607). The processing circuitry includes modules for partitioning the information on a total number of antenna port(s) and distributing the partitioned information to be provided in two or more predefined parts of a transmitted communication signal, the predefined parts preferably being stored in memory circuitry. According to an embodiment of the disclosure, the transmitting apparatus is preferably a base station (eNB) or a relay node.

Figure 4:
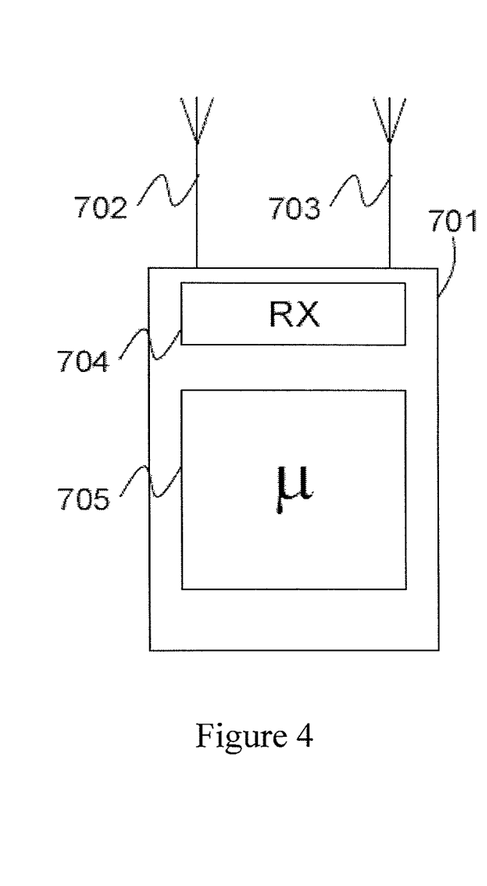
FIG. 4 shows a principal structure of an exemplary receiving apparatus according to the disclosure.

FIG. 4 shows a principle structure of an exemplary receiving apparatus (701) for a wireless communications system according to the present disclosure. The receiving apparatus includes a receiving circuitry (RX, 704) connected to one or more antennas (702, 703). The receiving circuitry includes electronics for reception of a communication signal. The receiving apparatus (701) includes a processing circuitry (μ, 705) operating on received signals provided via the receiving circuitry (704). The processing circuitry includes modules for determining from two or more predefined parts of a received communication signal transmitted from e.g. a base station, the predefined parts preferably being stored in memory circuitry of the receiving apparatus. The electronics of the processing circuitry determine from at least a second part of the communication signal a total number of transmission antenna ports to be applied. As need be, also the predefined first part of the communication signal is processed for determining the number of antenna ports to be applied for subsequent signal processing. According to an embodiment of the disclosure, the receiving apparatus is preferably a mobile station, such as a UE.

Furthermore, as understood by the person skilled in the art, the method for signalling number of antenna ports according to the present disclosure may be implemented in a computer program, having code means, which when run in a computer causes the computer to execute the steps of the method. The computer program is included in a computer readable medium of a computer program product. The computer readable medium may consist of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

It should also be understood that the present disclosure is not limited to the embodiments described above, but also relates to and incorporates all embodiments within the scope of the appended independent claims.

The invention claimed is:

1. A method of receiving a quantity of antenna ports of a transmitting apparatus in a wireless communication system, comprising:

receiving, by a receiving apparatus, a first type information on a physical broadcast channel (PBCH) in a case that the first type information is detectable to the receiving apparatus;

receiving, by the receiving apparatus, a second type information on a physical downlink shared channel (PDSCH) in a case that the second type information is detectable to the receiving apparatus, wherein the PDSCH is transmitted on at least one antenna port indicated by the first type information;

decoding, by the receiving apparatus, the quantity of antenna ports of the transmitting apparatus according to the first type information in a case that only the first type information is detectable to the receiving apparatus; and decoding, by the receiving apparatus, the quantity of antenna ports of the transmitting apparatus according to the first type information and the second type information in a case that both the first type information and the second type information are detectable to the receiving apparatus.

2. The method of claim 1, wherein the first type information indicates the quantity of antenna ports of the transmitting apparatus being one of the following: one, two and four.

3. The method of claim 1, wherein the second type information indicates the quantity of antenna ports of the transmitting apparatus being one of the following: zero, two, four, and eight.

4. The method of claim 1, wherein each of the antenna ports of the transmitting apparatus is defined by a reference signal.

5. The method of claim 1, wherein the second type information relates to a number of antenna ports, each of which is defined by a channel state information reference signal (CSI-RS).

6. The method of claim 1, wherein the first type information is used by a user equipment for demodulating at least one control channel.

7. The method of claim 1, wherein the second type information is used by a user equipment for channel measurement.

8. A receiving apparatus, comprising at least one processor configured to:

receive a first type information on a physical broadcast channel (PBCH) in a case that the first type information is detectable to the receiving apparatus;

receive a second type information on a physical downlink shared channel (PDSCH) in a case that the second type information is detectable to the receiving apparatus, wherein the PDSCH is transmitted on at least one antenna port indicated by the first type information;

decode a quantity of antenna ports of a transmitting apparatus according to the first type information in a case that only the first type information is detectable to the receiving apparatus; and decode the quantity of antenna ports of the transmitting apparatus according to the first type information and the second type information in a case that both the first type information and the second type information are detectable to the receiving apparatus.

9. The receiving apparatus of claim 8, wherein the first type information indicates the quantity of antenna ports of the transmitting apparatus being one of the following: one, two and four.

10. The receiving apparatus of claim 8, wherein the second type information indicates the quantity of antenna ports of the transmitting apparatus being one of the following: zero, two, four, and eight.

11. The receiving apparatus of claim 8, wherein each of the antenna ports of the transmitting apparatus is defined by a reference signal.

12. The receiving apparatus of claim 8, wherein the second type information relates to a number of antenna ports, each of which is defined by a channel state information reference signal (CSI-RS).

13. The receiving apparatus of claim 8, wherein the first type information is used by the receiving apparatus for demodulating at least one control channel.

14. The receiving apparatus of claim 8, wherein the second type information is used by the receiving apparatus for channel measurement.

15. A wireless communication system, comprising a receiving apparatus and a transmitting apparatus, wherein the receiving apparatus comprises at least one processor configured to:

receive a first type information on a physical broadcast channel (PBCH) in a case that the first type information is detectable to the receiving apparatus;

receive a second type information on a physical downlink shared channel (PDSCH) in a case that the second type information is detectable to the receiving apparatus, wherein the PDSCH is transmitted on at least one antenna port indicated by the first type information;

decode the quantity of antenna ports of the transmitting apparatus according to the first type information in a case that only the first type information is detectable to the receiving apparatus; and decode the quantity of antenna ports of the transmitting apparatus according to the first type information and the second type information in a case that both the first type information and the second type information are detectable to the receiving apparatus.

16. The wireless communication system of claim 15, wherein the first type information indicates the quantity of antenna ports of the transmitting apparatus being one of the following: one, two and four.

17. The wireless communication system of claim 15, wherein the second type information indicates the quantity of antenna ports of the transmitting apparatus being one of the following: zero, two, four, and eight.

18. The wireless communication system of claim 16, wherein the second type information indicates the quantity of antenna ports of the transmitting apparatus being one of the following: zero, two, four, and eight.

19. The wireless communication system of claim 15, wherein each of the antenna ports of the transmitting apparatus is defined by a reference signal.

20. The wireless communication system of claim 15, wherein the second type information relates to a number of antenna ports, each of which is defined by a channel state information reference signal (CSI-RS).

21. The wireless communication system of claim 18, wherein the second type information relates to a number of antenna ports, each of which is defined by a CSI-RS.

22. The wireless communication system of claim 15, wherein the first type information is used by the receiving apparatus for demodulating at least one control channel.

23. The wireless communication system of claim 15, wherein the second type information is used by the receiving apparatus for channel measurement.

24. The method of claim 2, wherein the second type information indicates the quantity of antenna ports of the transmitting apparatus being one of the following: zero, two, four, and eight.

25. The method of claim 3, wherein the second type information relates to a number of antenna ports, each of which is defined by a channel state information reference signal (CSI-RS).

26. The method of claim 24, wherein the second type information relates to a number of antenna ports, each of which is defined by a CSI-RS.

27. The receiving apparatus of claim 9, wherein the second type information indicates the quantity of antenna ports of the transmitting apparatus being one of the following: zero, two, four, and eight.

28. The receiving apparatus of claim 10, wherein the second type information relates to a number of antenna ports, each of which is defined by a channel state information reference signal (CSI-RS).

29. The receiving apparatus of claim 27, wherein the second type information relates to a number of antenna ports, each of which is defined by a CSI-RS.

30. A wireless communication system, comprising a receiving apparatus and a transmitting apparatus, wherein
the transmitting apparatus comprises at least one processor configured to:
transmit a first type information on a physical broadcast channel (PBCH); and
transmit a second type information on a physical downlink shared channel (PDSCH);
the receiving apparatus comprises at least one processor configured to:
receive the first type information on the PBCH in a case that the first type information is detectable to the receiving apparatus;
receive the second type information on the PDSCH in a case that the second type information is detectable to the receiving apparatus, wherein the PDSCH is transmitted on at least one antenna port indicated by the first type information;
decode a quantity of antenna ports of the transmitting apparatus according to the first type information in a case that only the first type information is detectable to the receiving apparatus; and
decode a quantity of antenna ports of the transmitting apparatus according to the first type information and the second type information in a case that both the first type information and the second type information are detectable to the receiving apparatus.

31. A method of communicating a quantity of antenna ports of a transmitting apparatus in a wireless communication system, comprising:
transmitting, by a transmitting apparatus, a first type information on a physical broadcast channel (PBCH);
transmitting, by the transmitting apparatus, a second type information on a physical downlink shared channel (PDSCH);
receiving, by a receiving apparatus, the first type information on the PBCH in a case that the first type information is detectable to the receiving apparatus;
receiving, by the receiving apparatus, the second type information on the PDSCH in a case that the second type information is detectable to the receiving apparatus, wherein the PDSCH is transmitted on at least one antenna port indicated by the first type information;
decoding, by the receiving apparatus, a quantity of antenna ports of the transmitting apparatus according to the first type information in a case that only the first type information is detectable to the receiving apparatus; and
decoding, by the receiving apparatus, a quantity of antenna ports of the transmitting apparatus according to the first type information and the second type information in a case that both the first type information and the second type information are detectable to the receiving apparatus.

32. A non-transitory computer-readable storage medium storing programming for execution by at least one processor of a receiving apparatus, the programming including instruction for:
receiving, by the receiving apparatus, a first type information on a physical broadcast channel (PBCH) in a case that the first type information is detectable to the receiving apparatus;
receiving, by the receiving apparatus, a second type information on a physical downlink shared channel (PDSCH) in a case that the second type information is detectable to the receiving apparatus, wherein the PDSCH is transmitted on at least one antenna port indicated by the first type information;
decoding, by the receiving apparatus, a quantity of antenna ports of the transmitting apparatus according to the first type information in a case that only the first type information is detectable to the receiving apparatus; and
decoding, by the receiving apparatus, a quantity of antenna ports of the transmitting apparatus according to the first type information and the second type information in a case that both the first type information and the second type information are detectable to the receiving apparatus.

\* \* \* \* \*

UNITED STATES PATENT AND TRADEMARK OFFICE
CERTIFICATE OF CORRECTION

PATENT NO. : 9,172,518 B2  
APPLICATION NO. : 14/511754  
DATED : October 27, 2015  
INVENTOR(S) : Mattias Frenne et al.

Page 1 of 1

It is certified that error appears in the above-identified patent and that said Letters Patent is hereby corrected as shown below:

On the Title Page

Left column, item (30), replace "2008 0 73631" with --PCT/CN2008/073631--.

Signed and Sealed this  
Fifteenth Day of March, 2016

Michelle K. Lee  
*Director of the United States Patent and Trademark Office*